R. GOLDSTEIN.
PHOTOGRAPHIC CAMERA.
APPLICATION FILED JAN. 31, 1910.
990,727.
Patented Apr. 25, 1911.
2 SHEETS—SHEET 1.
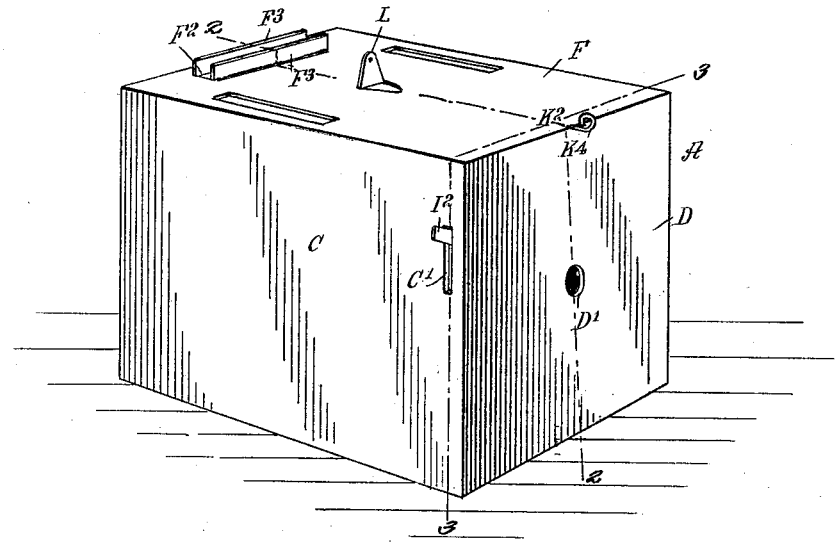
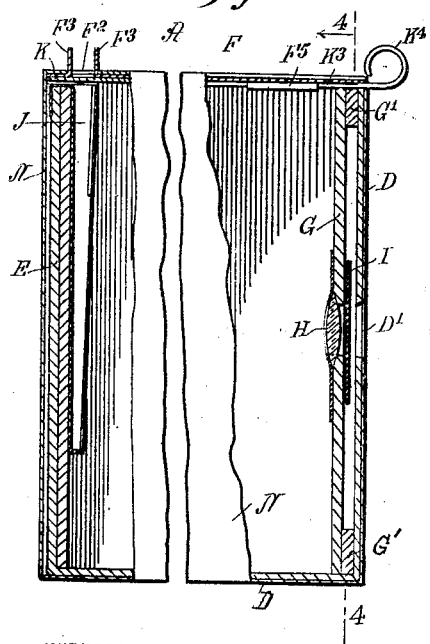
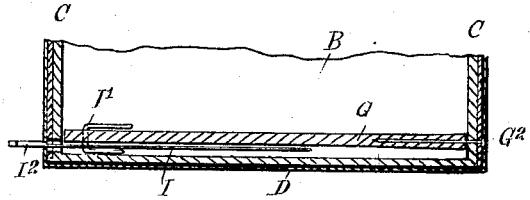
WITNESSES:
INVENTOR
Robert Goldstein
BY
ATTORNEYS R. GOLDSTEIN.
PHOTOGRAPHIC CAMERA.
APPLICATION FILED JAN. 31, 1910.
990,727.
Patented Apr. 25, 1911.
2 SHEETS—SHEET 2.
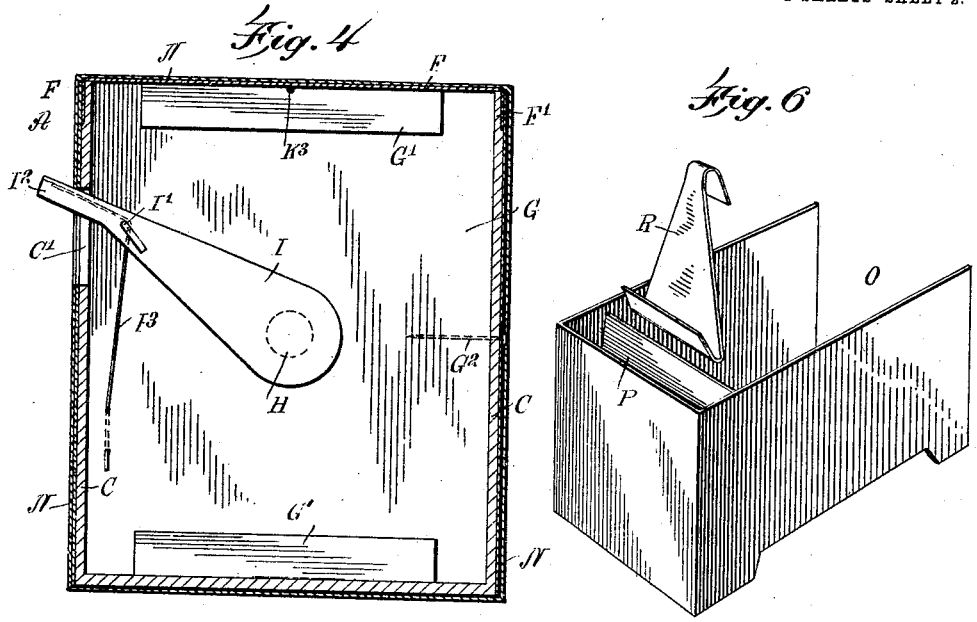
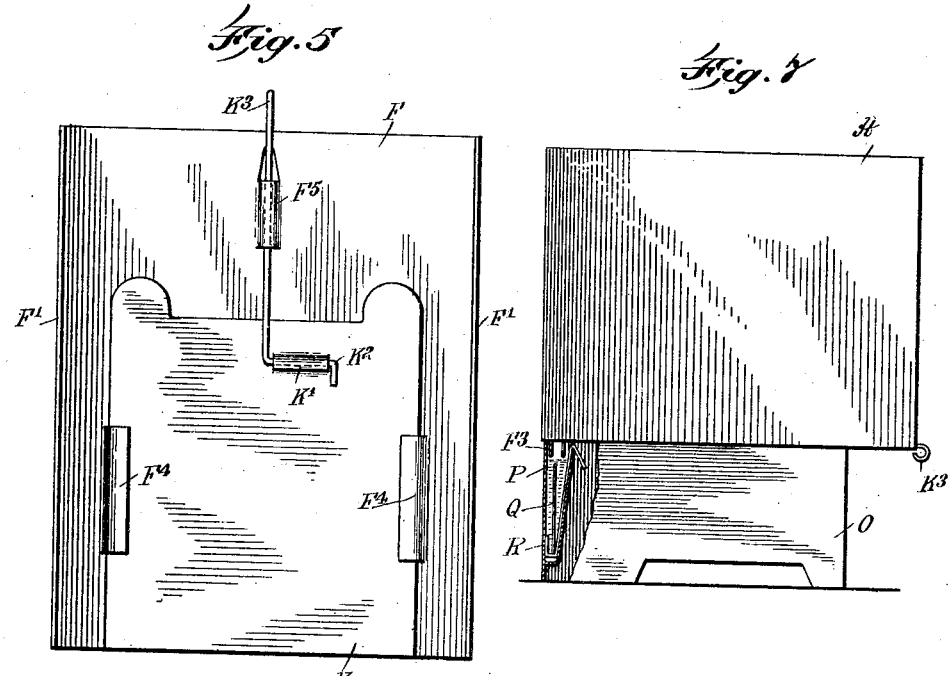
WITNESSES:
INVENTOR
Robert Goldstein
BY
ATTORNEYS

UNITED STATES PATENT OFFICE.

ROBERT GOLDSTEIN, OF NEW YORK, N. Y.

PHOTOGRAPHIC CAMERA.

990,727.   Specification of Letters Patent.   Patented Apr. 25, 1911.

Application filed January 31, 1910. Serial No. 540,994.

*To all whom it may concern:*

Be it known that I, ROBERT GOLDSTEIN, a citizen of the United States, and a resident of the city of New York, borough of Manhattan, in the county and State of New York, have invented a new and Improved Photographic Camera, of which the following is a full, clear, and exact description.

The invention relates to photographic cameras, such as shown and described in the application for Letters Patent of the United States, No. 510,394, filed by me July 30, 1909.

The object of the present invention is to provide certain new and useful improvements in photographic cameras, whereby the several parts can be readily assembled to reduce the cost of manufacturing to a minimum, and whereby the camera is rendered light tight, and can be conveniently manipulated for loading it in daylight, for sighting the object to be photographed, for making the exposure and transferring the exposed plate from the camera to a bath, to develop the plate in daylight. For the purpose mentioned, use is made of a casing, provided near the front with a partition carrying the lens and the shutter, the top of the casing being provided near the rear end with a slot flanked by rising flanges, the slot being adapted to be closed by a slide having a handle extending at the front of the camera and forming a front sighting member, used in conjunction with a rear sighting member rising from the top of the casing. In order to transfer the exposed plate from the camera casing to a developing bath, use is made of a stand for supporting the camera in an upside down position, the stand having a tank adapted to register with said casing slot, so that when the slide is withdrawn the exposed plate drops into the bath, while the camera casing forms the top of the tank, to exclude the light during the transfer.

A practical embodiment of the invention is represented in the accompanying drawings forming a part of this specification, in which similar characters of reference indicate corresponding parts in all the views.

Figure 1 is a perspective view of the camera and showing the casing without the covering; Fig. 2 is an enlarged sectional side elevation of the camera on the line 2—2 of Fig. 1; Fig. 3 is a sectional plan view of the front end of the camera on the line 3—3 of Fig. 1; Fig. 4 is a cross section of the same on the line 4—4 of Fig. 2, looking rearward; Fig. 5 is an enlarged inverted plan view of the metallic top and the slide mounted thereon; Fig. 6 is a perspective view of the stand having the developing tank and the plate carrier; and Fig. 7 is a side elevation of the camera in position on the stand, parts being shown in section.

The casing A of the photographic camera is in box form and consists of a bottom B, sides C, C, a front D, a back E and a top F. The bottom B, the sides C, C, the front D and the back E are preferably made of cardboard, and the sides and back are preferably of two layers of cardboard, as plainly indicated in Figs. 2 and 3, while the top F is preferably made of sheet metal and is provided at the sides with depending flanges F', adapted to fit between the layers of the sides C, C, as plainly indicated in Fig. 4.

Within the casing A, adjacent to the front D thereof, is arranged a transverse partition G carrying the lens H and the shutter I. The lens H is directly opposite an opening D' formed in the front D, and the shutter I is fulcrumed at I' on the front face of the partition G, so as to extend normally between the opening D' and the lens H, to screen the latter from the light until it is desired to make an exposure. The partition G is provided on its front face, preferably at the top and bottom, with spacing blocks G', adapted to abut against the rear face of the front D, to space the partition G from the said front D, with a view to allow proper up and down swinging movement of the shutter I. The shutter I is provided with a handle I², extending through a slot C' in the left side C, so that the handle I² extends to the outside of the casing, to be engaged by the operator for swinging the shutter I into an open position against the tension of a spring I³, secured at one end to the partition G and passing over the fulcrum I' to the handle I², to exert upward pressure on the handle, with a view to hold the shutter I normally closed. The fulcrum I' is in the form of a pin extending through the partition G and bent over at the front and back, as plainly indicated in Fig. 3, so as to render the construction as cheap as possible, at the same time permitting a proper swinging of the shutter I, for opening and closing the light-admission aperture D'. The handle I², of the shutter I, by passing through the slot C', forms a fastening means for holding one side of the partition G in place, the other side of the said partition being engaged by a pin G² driven through the right-hand side C of the casing A, into the partition G in a transverse direction, whereby the partition is securely held in place in a very simple manner.

On the inner face of the back E of the casing A is arranged a plate support J, provided at the top with a hook, hooking between the layers of the back E, to hold the plate support J in position on the said back, as will be readily understood by reference to Fig. 2. The plate support J is directly opposite the lens H, and is adapted to support a sensitive plate adapted to be passed into the plate support through a slot F² formed in the metallic top F near the rear thereof. The plate support J is of the same construction as shown and described in the application for Letters Patent above referred to, so that further detail description of the same is not deemed necessary, it being understood, however, that the top of the said support is in registry with the slot F², from the front and rear walls of which rise the flanges F³ for the passage of the magazine plate holder, preferably of the construction shown and described in the application for Letters Patent of the United States, No. 532,363, filed by me December 10, 1909. The slot F² is adapted to be opened and closed by a slide K, mounted to slide in guideways F⁴, struck up from the top F at the under side thereof, and the forward end of the slide K is provided with a bearing K′ engaged by the angular end K² of a forwardly-extending rod K³, passing through a bearing F⁵ formed integrally on the top F, as plainly indicated in Figs. 2 and 5. The rod K² extends through the front D, and the outer end of the slide K³ terminates in an upwardly-bent handle K⁴, adapted to be taken hold of by the operator, for conveniently moving the slide forward and backward with a view to open and close the slot F². The handle K⁴ also forms a front sighting member, operating in conjunction with a rear sighting member L in the form of an apertured lug, struck up from the top F, as plainly indicated in Fig. 1. Thus by the user of the camera sighting the object along the members L and K⁴, the object is properly focused on the plate held in the plate support J at the time the shutter I is swung into an open position, to insure proper location of the image of the object on the sensitive plate.

The camera casing, after the objects are assembled, is covered with a suitable covering N, preferably of black paper, to render the casing absolutely light proof, it being understood, however, that the slot F², the opening D′ and the slot C′ remain uncovered by the covering N.

When the exposure has been made and it is desired to develop the plate, use is made of a stand O, preferably made of sheet metal, and adapted to support the casing A in an upside down position, as plainly indicated in Fig. 7. One end of the stand O is provided with a developing tank P, adapted to contain a developing liquid and adapted to receive the flanges F³ at the time the camera is in position on the stand O, as indicated in Fig. 7. Now when the camera A is in place on the stand O, and the operator pulls the handle K⁴, to cause the slide K to uncover the slot F², then the exposed plate Q drops out of the support J, and by way of the slot F² passes into the developing tank P, the lower end of the plate Q resting on a plate carrier R held in the tank P, as plainly indicated in Fig. 7. Now it will be noticed that the camera A, during the transfer of the exposed plate, from the camera to the tank P, closes the latter, so as to prevent the plate during the transfer from being light struck. After the transfer, the camera is removed from the stand O, and the plate Q, after being developed in say about a minute, is lifted out of the bath by the carrier R, in which the plate may be held until it is fixed and dry.

It is understood that the sensitive plate Q is preferably of the tintype variety, which is readily developed and fixed when submerged in the fluid contained in the tank P.

Having thus described my invention, I claim as new and desire to secure by Letters Patent:

1. In combination, a photographic camera and a stand for supporting the same in an upside down position, the said camera having a casing provided with a plate admission slot at the top near the rear end, a slide for controlling the said slot, and a plate support within the casing and in register with the said slot, the said stand having a developing tank adapted to register with the said slot when said camera is so supported to allow the exposed plate in the said support to drop through the slot into the tank on withdrawing the slide.

2. A photographic camera provided with a casing having a slot at the top near the rear end, a slide controlling the said slot and having a handle extending upward at the front end of the casing to form a front sighting member, and a rear sighting member on the top of the casing.

3. A photographic camera provided with a casing having a slot at the top near the rear end, a slide controlling the said slot and having a handle extending upward at the front end of the casing to form a front sighting member, and a rear sighting member on the top of the casing in the form of an apertured lug struck up from the top of the casing.

4. A photographic camera provided with a casing having a slot at the top near the rear end, a slide controlling the said slot and having a handle extending upward at the front end of the casing to form a front sighting member, and a rear sighting member in the form of an apertured lug struck up from the top of the casing, the said slide extending under the opening formed in the top of the casing by the said struck up lug to close the said opening.

5. A photographic camera provided with a casing having an aperture in the front and a slot in its side wall, a partition in the front end of the camera and carrying a lens and a shutter, the lens being in register with the said aperture, and the said shutter being fulcrumed on the front face of the said partition, the said shutter having one end extending through the slot in the wall of the casing, and forming a handle for manipulating the shutter, the handle end of the shutter also forming a means for holding the partition in place, and a fastening means on the casing engaging the said partition opposite the shutter handle.

6. A photographic camera provided with a casing having an aperture in the front, a slot in its side wall, a partition in the front end of the camera and carrying a lens and a shutter, the lens being in register with the said aperture and the said shutter being fulcrumed on the front face of the said partition, the said shutter having one end extending through the slot in the wall of the casing, and forming a handle for manipulating the shutter, the handle end of the shutter also forming a means for holding the partition in place at one side of the casing, means at the other side of the casing engaging the partition, and spacing blocks on the front face of the partition for engagement with the inner face of the front of the casing.

7. A photographic camera provided with a casing having an aperture in the front and a slot in its side wall, a partition in the front end of the camera and carrying a lens and a shutter, the lens being in register with the said aperture and the said shutter being fulcrumed at one side of the center of length on the front face of the said partition, the said shutter having one end extending through the slot in the wall of the casing, and forming a handle for manipulating the shutter, the handle end of the shutter also forming a means for holding the partition in place, and a spring fastened at one end to the said partition and extending over the fulcrum of the shutter and engaging with its other end the said handle end of the shutter.

8. A photographic camera having a casing, the front, back, bottom and sides of which are formed of cardboard and the sides being of two layers, and a metallic top having turned-down side flanges extending between the layers of the sides of the casing, the said top having an integral sighting member, a slot, and integral flanges at the sides of the slot.

9. A photographic camera having a casing, the front, back, bottom and sides of which are formed of cardboard, and the sides being of two layers, a metallic top having turned-down side flanges extending between the layers of the sides of the casing, the said top having a slot near the rear, struck-up flanges rising at the sides of the slot and guide flanges at the under side, and a slide mounted to slide in the said guide flanges for closing and opening the said slot.

10. A photographic camera having a casing, the front, back, bottom and sides of which are formed of cardboard and the sides being of two layers, a metallic top having turned-down side flanges extending between the layers of the sides of the casing, the said top having a slot near the rear, struck-up flanges rising at the sides of the slot and guide flanges at the under side, and a slide mounted to slide in the said guide flanges for closing and opening the said slot, the said slide having a forwardly-extending rod terminating in a handle exterior of the casing, the said rod engaging a guideway formed on the said top.

In testimony whereof I have signed my name to this specification in the presence of two subscribing witnesses.

ROBERT GOLDSTEIN.

Witnesses:
 THEO. G. HOSTER,
 PHILIP D. ROLLHAUS.

---

Copies of this patent may be obtained for five cents each, by addressing the "Commissioner of Patents, Washington, D. C."